United States Patent [19]

Carey

[11] Patent Number: 5,481,466
[45] Date of Patent: Jan. 2, 1996

[54] MEAT SLICING MACHINE AND METHOD OF USE THEREOF

[75] Inventor: Joseph Carey, Dublin, Ireland

[73] Assignee: Townsend Engineering Company, Des Moines, Iowa

[21] Appl. No.: 189,593

[22] Filed: Jan. 31, 1994

[30] Foreign Application Priority Data

Apr. 23, 1992 [IE] Ireland .................................... 921303

[51] Int. Cl.$^6$ .............................. G06F 19/00; B26D 5/20
[52] U.S. Cl. ................. 364/474.09; 364/474.33; 83/37; 83/42; 83/364; 83/367
[58] Field of Search ........................ 364/474.33, 474.09, 364/567, 562; 83/37, 38, 367

[56] References Cited

U.S. PATENT DOCUMENTS

| | | | |
|---|---|---|---|
| 3,642,046 | 2/1972 | Mathews, Jr. et al. | 364/474.02 |
| 3,730,742 | 5/1973 | Burton et al. | 99/537 |
| 3,846,957 | 11/1974 | Divan | 53/502 |
| 3,846,958 | 11/1974 | Divan | 53/502 |
| 3,913,434 | 10/1975 | Smithers | 83/163 |
| 4,029,161 | 6/1977 | Foster et al. | 364/466 |
| 4,114,492 | 9/1978 | Skidmore | 83/367 |
| 4,123,959 | 11/1978 | Schill | 83/874 |
| 4,208,933 | 6/1980 | Skidmore | 83/367 |
| 4,217,650 | 8/1980 | Kuchler | 364/567 |
| 4,329,900 | 5/1982 | Dennis et al. | 83/355 |
| 4,408,519 | 10/1983 | Schill | 99/486 |
| 4,532,840 | 8/1985 | Antonissen | 83/71 |
| 4,534,548 | 8/1985 | Hanau | 270/58 |
| 4,535,881 | 8/1985 | Mims | 198/418.1 |
| 4,572,044 | 2/1986 | Antonissen | 83/42 |
| 4,580,475 | 4/1986 | Antonissen | 83/71 |
| 4,719,831 | 1/1988 | Smithers | 83/355 |
| 4,920,875 | 5/1990 | Schill | 99/589 |
| 5,109,936 | 5/1992 | Ruppel | 177/25.19 |
| 5,117,717 | 6/1992 | Mally | 83/47 |
| 5,141,761 | 8/1992 | Haerr | 426/393 |
| 5,267,168 | 11/1993 | Antonissen et al. | 364/468 |

FOREIGN PATENT DOCUMENTS

| | | |
|---|---|---|
| 0127463B1 | 2/1987 | European Pat. Off. . |
| 2099609B | 12/1982 | United Kingdom . |

Primary Examiner—Paul P. Gordon
Attorney, Agent, or Firm—Zarley, McKee, Thomte, Voorhees & Sease

[57] ABSTRACT

A meat slicing machine has a frame having an inclined support surface with upper and lower ends. A slicing element is on the frame adjacent the lower end of the support surface. A weighing element on the frame is operationally connected to the support surface for weighing an elongated slab supported thereon. A measuring mechanism is provided on the frame for measuring the length of the slab before it is sliced. Stops are on the frame for stopping the slab of meat at the time it is weighed and the length is measured. Laser elements are provided on the frame for measuring the lateral width and the upper surface of the slab of meat as it is moved from the point of being weighed towards the slicing element. A computer is operatively connected to the weight and length measuring mechanism. The computer has a storage bank including known historical data on slabs of meat having known weights, lengths and density factors. The method of slicing meat entails the use of the slicing machine to weigh a slab of meat, measure its length, and comparing this data with historical data on known slabs of meat having similar weights, lengths and density factors.

28 Claims, 4 Drawing Sheets

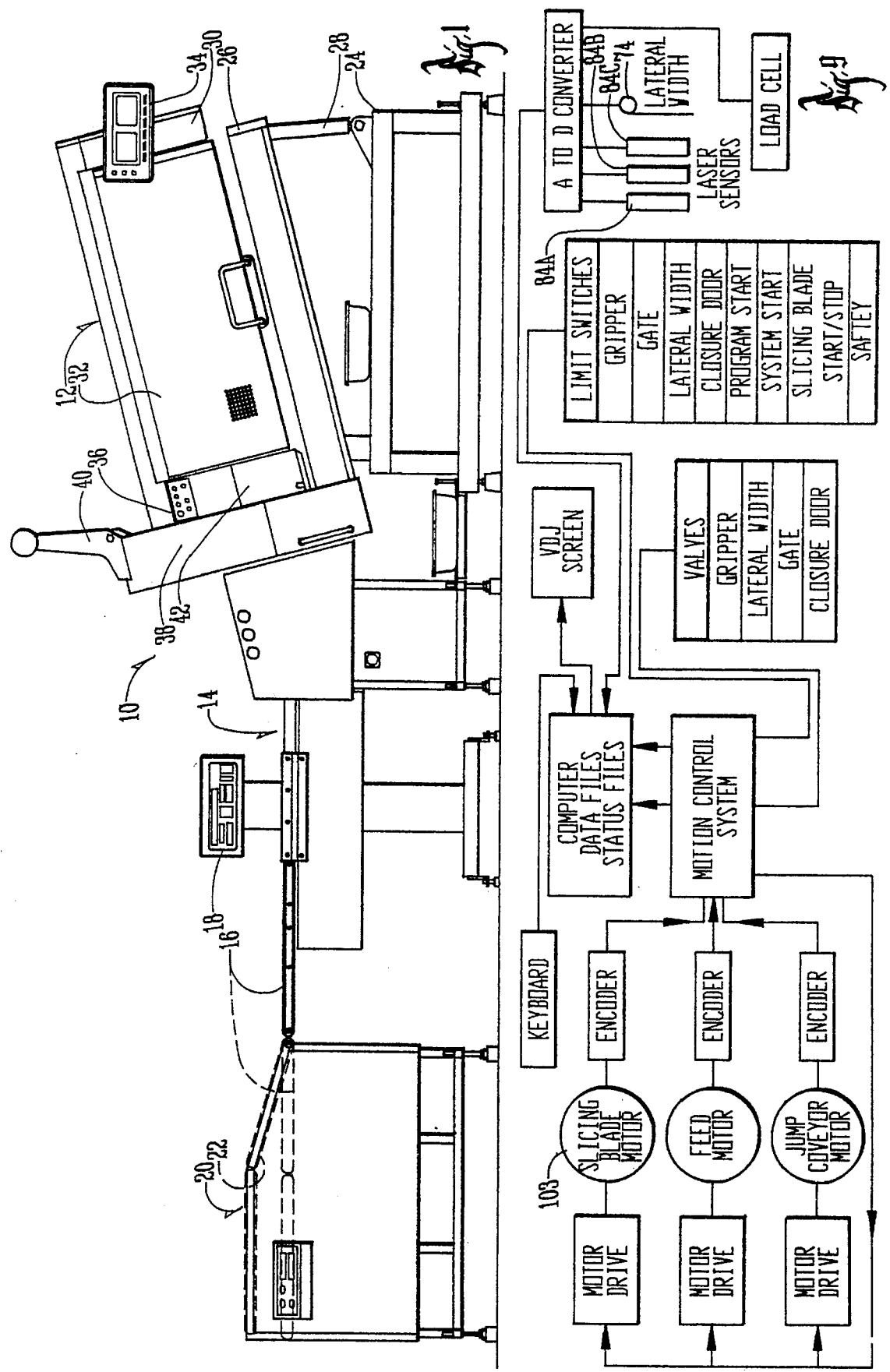

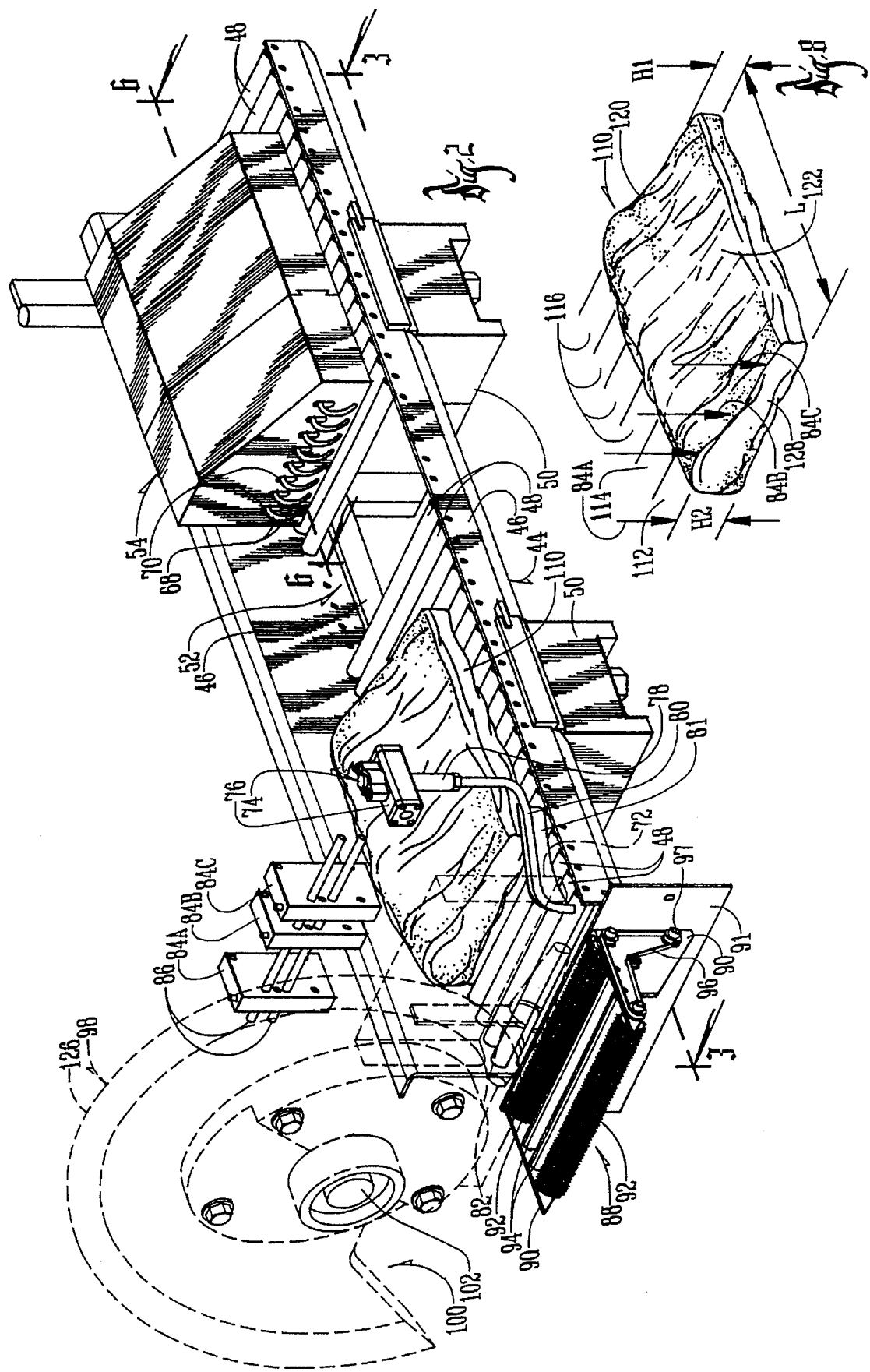

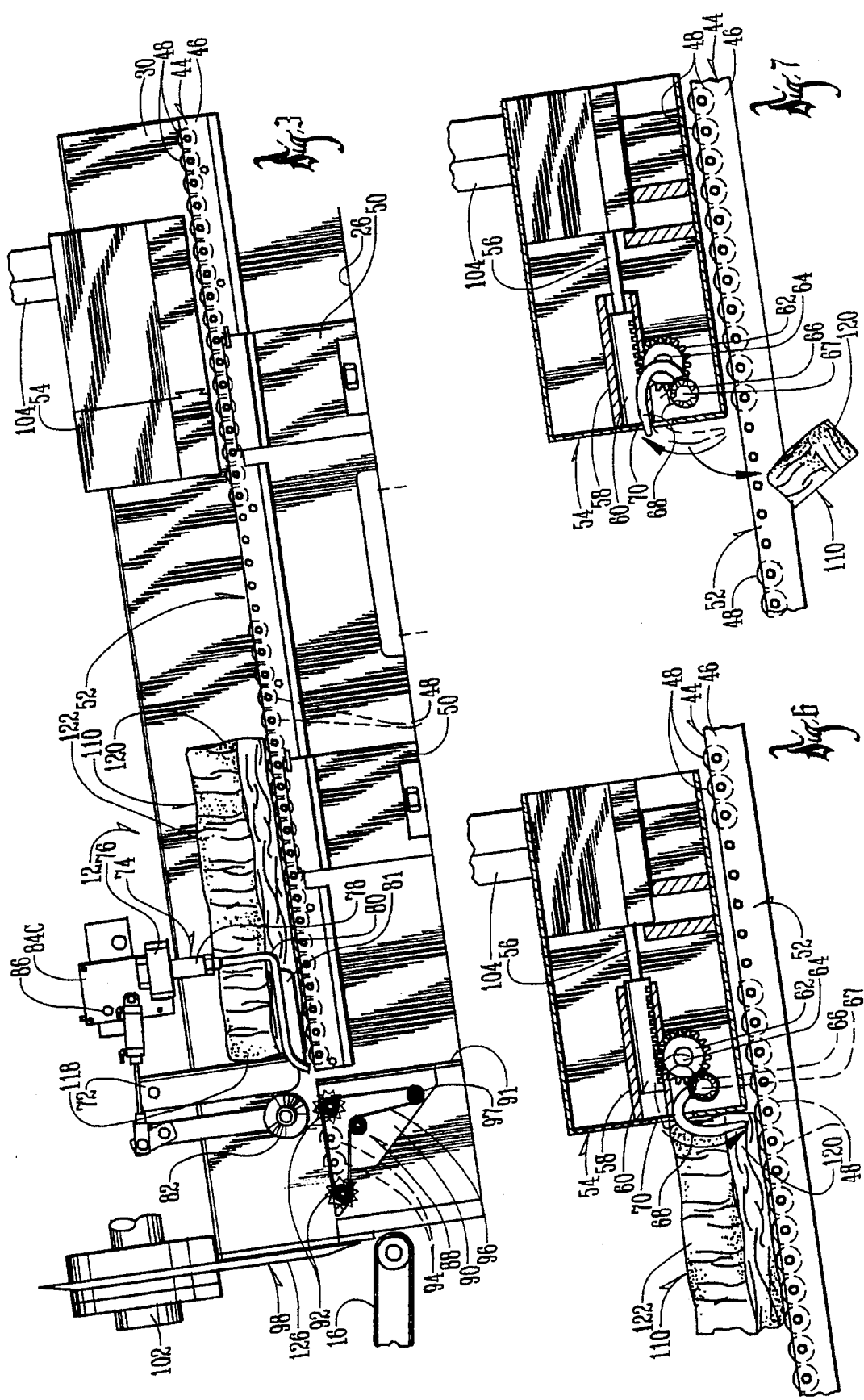

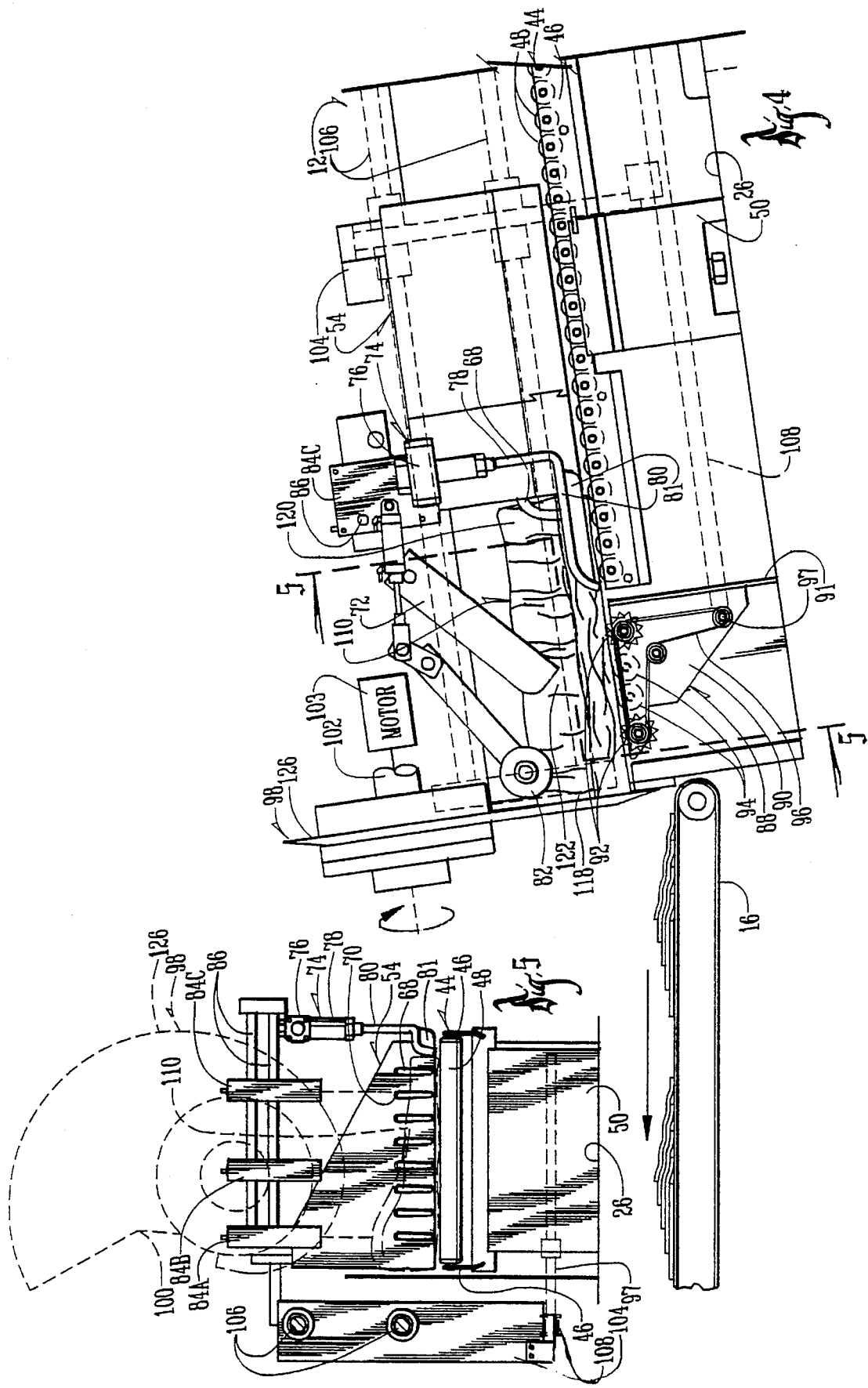

MEAT SLICING MACHINE AND METHOD OF USE THEREOF

TECHNICAL FIELD

My invention relates to a meat slicing machine and method of use thereof, and more particularly, to a machine to slice bacon and the like.

BACKGROUND ART

Slicing machines of the prior art comprise a rotating blade which either has a spiral cutting edge or a circular cutting edge and is mounted for planetary motion, and means to feed the product towards the blade so that upon each revolution or each gyration of the blade, one slice is cut from the face of the product. The means to feed the product may be a continuous conveyor but usually the slicer includes a fixed platform on which the product is placed and a feeding head which engages the rear face of the product and which urges it towards the blade. The feeding head is moved by a timing belt or by a lead screw driven by a stepping or variable speed electric motor.

Meat slicing machines have a common application in the meat industry. They serve to slice raw/cooked meat products like beef, bacon and ham, etc., into consumer usable portions. These portions may be selected by weight, size or number of slices. The trend today and indeed the demand is for fixed weight portions with a fixed number of slices per pack and at a fixed price.

The present slicing machines whilst very expensive fail to achieve fully the performance demanded by the meat industry. This is particularly true in the bacon processing industry where the endeavor is to produce packs of sliced rashers of even slice thickness to a fixed target weight. The present slicing machines' failure is due mainly in part to the varying dimensions/density factors that the raw materials presents.

More recently, slicing machines have been made more sophisticated by the inclusion downstream of the slicing machine of means to weigh a group of slices cut by the slicing machine, and then, in dependence upon the weight of this preceding group, vary the speed of movement of the product towards the blade by a feedback system to insure, as far as possible that each slice has a particular, predetermined weight. This apparatus is very complicated, and inevitably, there is some time lag between the cutting of a group of slices and the determination that the group has been cut too thickly or too thinly.

Further developments made use of the differences between pieces of meat products by weighing the piece and measuring its length to achieve its "weight per unit length". Further use has been made of the well-known fact that meat products have a "weight distribution curve" particular to the individual type of product.

Computer programs have been used to utilize such gathered information so as to produce "an anticipated weight distribution" for a particular product to be sliced, and to target a desired individual "slice weight". This is repeated until the required number of slices for the package weight is found. This system produces reasonable results but fails to produce a pack with uniform slice thicknesses within the package, and this is due to the fact that the system is designed to produce an individual slice weight by varying the individual slice thicknesses to accomplish this result.

A further disadvantage of the above system is the means to weigh the product. The operator is required to first place the meat on the platter (weighing scale) to register the weight, and then remove it and place it on the slicer table. This obviously entails double handling of the product.

It is therefore a principal object of this invention to provide a meat slicing machine and method of use thereof for handling the variable factors of a given meat product relating to dimensions and density so as to satisfy the performance demands for fixed weight packages with a uniform slice thickness throughout the pack.

SUMMARY OF THE INVENTION

The method of this invention entails laying a slab of product to be sliced on a supporting surface located upstream from a slicing blade; weighing the slab and measuring the length thereof while the slab is on the supporting surface; comparing the weight and length of the slab with historical data of known historical slabs having known weights, lengths and density factors, and selecting an operational density factor from the historical data based upon historical slabs having weights and lengths similar to that of the slab; selecting a pre-determined draft weight; selecting a pre-determined number of slices for each draft to be sliced; calculating the volume of the first draft of the slab having the pre-determined draft weight; and slicing the first draft into the pre-determined number of slices of equal thickness; and then repeating the aforementioned steps until the substantial length of the slab is sliced.

The machine of this invention comprises a frame having an inclined support surface with upper and lower ends. A slicing means is on the frame adjacent the lower end of the support surface. A weighing means on the frame is operationally connected to the support surface for weighing an elongated slab supported thereon. Means are provided on the frame for measuring the link thereof before the slab is sliced. Stop means are on the frame for stopping the slab of meat at the time it is weighed and the length is measured. Further means are provided on the frame for measuring the lateral width and the upper surface of the slab of meat as it is moved from the point of being weighed towards the slicing means. Computer means are operatively connected to the weight and length measuring means. The computer means has a storage bank including known historical data on slabs of meat having known weights, lengths and density factors. The computer means includes further means for comparing the weight and length of the slab to historical data for comparison with historical slabs of similar weight and length to permit identification of the density factor of such historical slabs.

BRIEF DESCRIPTION OF THE DRAWINGS

FIG. 1 is a side elevational view of a meat slicing station showing the meat slicing machine of this invention at the right-hand side thereof;

FIG. 2 is a partial perspective view of the operator's station of the machine showing a slab of meat moving towards a slicing mechanism;

FIG. 3 is a side elevational view of the structure of FIG. 2 as taken on line 3—3 of FIG. 2;

FIG. 4 is an enlarged scale partial side elevational view similar to the left-hand end of FIG. 3 but shows a slab of meat as it is being sliced;

FIG. 5 is a partial sectional view taken on line 5—5 of FIG. 4;

FIG. 6 is a sectional view taken on line 6—6 of FIG. 2;

FIG. 7 is a view similar to that of FIG. 6 but shows gripper elements releasing the residue portion of a slab of meat;

FIG. 8 is a perspective view of a typical slab of bacon to be sliced in the machine of FIG. 1; and FIG. 9 is a schematic view showing the computer control system for this invention.

DESCRIPTION OF THE PREFERRED EMBODIMENT

With reference to FIG. 1, the numeral 10 designates a meat slicing station including a meat slicing machine 12 which is upstream of a conveyor 14 which includes conveyor belt 16. A conventional scale is operatively connected to conveyor 14 for weighing groups of sliced products that are being conveyed by the belt 16. A separator conveyor 20 receives belt 16 and has a reject conveyor 22 which is adapted to receive groups of sliced products which do not have a total weight within pre-determined parameters.

Again with reference to FIG. 1, frame 24 has a frame chassis 26 which is pivotally secured to frame 24 by means of height adjustable arm 28. Slicer frame 30 includes a closure door 32 which is pivotally secured thereto. A computer screen 34 is mounted thereon as is control panel 36 and slicer housing 38. A counter weight 40 is secured to slicer housing 38 to facilitate the tilting of the slicer housing to clean, inspect or otherwise gain access to the slicer blade which will be described hereafter. A safety panel 42 is also mounted on slicer frame 30 to protect the operator from some of the working components as will be described hereafter.

With reference to FIG. 2, a roller support means 44 has spaced parallel side rolls 46 with conventional rollers 48 extending therebetween. Roller support means 44 is supported on conventional load cells 50 which are adapted to weigh the meat product on the rollers. Several of the rollers are removed to create all access opening 52 which is adapted to receive residue meat as will be described hereafter.

A gripper housing 54 is mounted on roller support means 44 and is adapted to be moved longitudinally thereon. An air piston rod 56 is adapted to move into horizontal hollow tube 58. A rack 60 is secured to the outer end of rod 56 and is adapted to operatively engage pinon 62 which is mounted on lateral extending shaft 64. Gear 66 is mounted on laterally extending shaft 67 and is in mesh with pinion 62. Gripping fingers 68 are also secured to shaft 68 and are adapted to extend through apertures 70 in housing 54 when it is desired to have the gripping fingers engage the slab of meat being sliced. The gripping fingers 68 are moved from the retracted position in FIG. 7 to the gripping position in FIG. 6 when the piston rod 56 is moved in a right-hand direction as viewed in FIGS. 6 and 7. Rod 56 is actuated by an air cylinder (not shown). Rack 60 causes pinion 62 to rotate which in turn causes gear 66 and shaft 67 to rotate, thereby rotating the gripping fingers between the positions of FIGS. 6 and 7 depending on the direction of movement of rod 56.

As seen in FIGS. 3 and 4, a gate 2 is pivotally mounted above the plane of roller support means 44 and when in its vertical position, is adapted to stop the movement of a slab of meat downwardly on rollers 48. As discussed hereafter, after the length and weight of a slab of meat engage in a gate is measured, the gate moves upwardly to a horizontal position to permit the slab of meat to continue moving towards a slicing location.

A lateral width measuring means 74 is mounted on slicer frame 30 and extends out of a rack and pinion control box 76. As seen in FIG. 2, a downwardly extending arm support 78 supports an L-shaped arm 80 which supports a horizontally disposed sensor element 81 which engages the side of a slab of meat to sense the lateral width thereof. The L-shaped arm 80 is adapted to rotate about its vertical axis.

A hold down roller 82 is mounted on slicer frame 30 and is adapted to move downwardly to engage the upper surface of a slab of meat after the slab of meat has been weighed and is moved towards a slicing position.

As best shown in FIGS. 5 and 8, three laser sensors are suspended over the lower end of roller support means 44 and are adapted through the laser beams emitted therefrom to sense the thickness of a slab of meat passing thereunder. The reflected laser beams serve to scan the surface of the meat slab passing thereunder, and the relative thickness at three locations along the length of the meat slab are thereupon sensed and recorded in the computer of the device to be described hereafter. The laser sensors, identified in FIG. 8 by the numerals 84A, 84B and 84C, include CCD sensors, optics and fast processing circuits to supply the digital measurements of the height of the cross section of the scanned meat slab at 50 times per second. These laser scanners are available from Axis U.S.A., Inc. of Marlboro, Mass., U.S.A. The laser sensors are suspended on laterally extending rods 86 which are secured to slicer frame 30.

With reference to FIG. 8, roller assembly 88 has brackets 90 mounted to transverse plate 91. Gripper rolls 92 are suspending between the upper and lower ends of the brackets 90 with non-gripping rolls 94 being positioned between gripper rolls 92 and also being supported on brackets 90. A continuous belt 96 connects the ends of gripper rolls 92 and drive shaft 97.

As best seen in FIGS. 2 and 4, a conventional slicing blade 98 is mounted on slicer frame 30 and includes a conventional cut-out portion 100. Blade 98 is mounted on power shaft 42 which is powered by an conventional means such as motor 103 which is symbolically shown in FIG. 4. Typically, motor 103 would be mounted on the upper end of slicer frame 30.

As seen in FIGS. 4 and 5, a slide arm 104 which is connected to gripper housing 54 is slidably mounted on rails 106. An elongated timing belt 108 formed into a continuous loop has its upper portion rigidly secured to the lower end of slide arm 104 (FIG. 5) with its lower length extending underneath the arm. The timing belt is operatively secured also to the end of shaft 97 which insures as the arm 104 moves longitudinally on rails 106, the shaft 97 will rotate gripping rolls 92 at the same velocity that the arm 104 is moving gripper housing 54 along the roller support means 44. Bolt 10B is connected to a motor (not shown).

As seen in FIG. 8, a typical bacon slab 110 includes a first draft 112, a second draft 114, and subsequent drafts 116. As the term is used herein, "draft" means a sectional slab 110 of substantially equal weight which is sliced into a plurality of equal numbered slices with each slice in each draft having substantially the same thickness. Bacon slab 110 has a collar end 118 and an oyster end 120, with a midsection 122. The collar end 118 is typically of greater mass than the oyster end, with the midsection having an intermediate mass of more constant vertical thickness. The term "face area" as used herein is the cross sectional area of the slab.

FIG. 9 is a schematic view of the computer system which operates and controls machine 12. A plurality of valves, motors, and limit switches of conventional nature are located throughout machine 12 to sense activity of the machine which is coordinated and controlled by the computer system 124.

The normal operation of the machine commences when the slab of meat 120 is placed directly on the roller support means 44. The target weight of each draft of slab 120 (i.e. 200 grams) is placed in the computer along with the desired predetermined number of slices for each draft. Additionally, the parameters for the thickness of each slice are also imposed on the computer.

The operator starts the slicing cycle by closing the door 32. The load cells sense the weight of the meat product and that value is logged into the systems computer and also into the products statistics file. The gripper housing 54 then moves in a forward direction pushing the meat product 120 up against gate 72. This activates a switch (not shown) which first stops all movement and then tells the gripping finger 68 to grip the product as described heretofore. At this point the length of the product is logged into the systems computer and also into the products statistics file. The length measurement is made "digital" by the feed motors "encoder". Every position of the gripper housing 54 during the slicing cycle is known.

When the computer 124 then knows the weight and length of the meat product 120, it looks up the density table in its memory with reference to the weight and length of similar meat products and uses the density factor as a starting point for the slicing of meat slab 120. A typical density table appears below showing the density of meat slabs having different weights and lengths.

The speed of rotation of the slicer blade 98 has been preselected so that it is running at a constant speed. The volume of meat product representative of the required target or pack weight is then moved through the blade at a constant speed assuring uniform thickness of each slice in that particular draft. Since the volume of each draft may vary, the feed speed for each draft may change depending on the measured volume for the target weight. The hold down roller 82 (FIG. 4) exerts downward pressure on the slab 110 as it moves towards the slicing blade 98.

The foregoing steps are repeated until substantially all of the meat slab 120 has been divided into a plurality of drafts having substantially the same weight with each draft having the same number of slices with the slices in each draft having substantially the same thickness.

The slices from each draft are moved downstream from slicing blade 98 on conveyor 14 where each draft is weighed by scale 18. The actual weight of each draft is typically retained for statistical analysis (management system). Typically, the density of each slab will be factored into the data already in the computer to provide a broader data base and perhaps an even more accurate density factor in the stored memory of the computer.

DENSITY TABLE

| WEIGHT | | | | | | | | |
|---|---|---|---|---|---|---|---|---|
| 4950 | 1.09 | 1.08 | 1.08 | 1.04 | 1.07 | 1.04 | 1.04 | 1.03 |
| 5000 | 1.06 | 1.05 | 1.05 | 1.04 | 1.07 | 1.08 | 1.05 | 1.03 |
| 5050 | 1.09 | 1.03 | 1.10 | 1.04 | 1.08 | 1.04 | 1.06 | 1.00 |
| 5100 | 1.09 | 1.05 | 1.09 | 1.04 | 1.06 | 1.03 | 1.05 | 1.05 |
| 5150 | 1.06 | 1.03 | 1.05 | 1.03 | 1.10 | 1.04 | 1.05 | 1.05 |
| 5200 | 1.11 | 1.03 | 1.09 | 1.02 | 1.07 | 1.03 | 1.06 | 1.03 |
| 5250 | 1.03 | 1.03 | 1.06 | 1.04 | 1.05 | 1.03 | 1.05 | 1.04 |
| 5300 | 1.02 | 1.03 | 1.08 | 1.02 | 1.06 | 1.03 | 1.08 | 1.03 |
| 5350 | 1.04 | 1.03 | 1.03 | 1.02 | 1.08 | 1.03 | 1.05 | 1.03 |
| 5400 | 1.03 | 1.03 | 1.06 | 1.03 | 1.05 | 1.01 | 1.03 | 1.05 |
| 5450 | 1.07 | 1.03 | 1.08 | 1.04 | 1.07 | 1.03 | 1.03 | 1.05 |
| 5500 | 1.03 | 1.03 | 1.04 | 1.03 | 1.05 | 1.06 | 1.05 | 1.05 |
| 5550 | 1.03 | 1.03 | 1.03 | 1.03 | 1.03 | 1.03 | 1.06 | 1.03 |
| 5600 | 1.03 | 1.03 | 1.03 | 1.03 | 1.03 | 1.03 | 1.09 | 1.03 |
| 5650 | 1.03 | 1.03 | 1.03 | 1.03 | 1.06 | 1.03 | 1.04 | 1.03 |
| 5700 | 1.06 | 1.03 | 1.03 | 1.03 | 1.04 | 1.03 | 1.04 | 1.03 |
| 5750 | 1.03 | 1.03 | 1.03 | 1.03 | 1.03 | 1.03 | 1.04 | 1.03 |
| 5800 | 1.03 | 1.03 | 1.03 | 1.03 | 1.03 | 1.03 | 1.05 | 1.03 |
| 5850 | 1.03 | 1.03 | 1.03 | 1.03 | 1.03 | 1.03 | 1.03 | 1.03 |
| LENGTH | | | | | | | | |
| | 495 m | 500 m | 505 m | 510 m | 515 m | 520 m | 525 m | 530 m |

After the weight and length of the meat slab 120 has been sensed, the gate 72 lifts up to allow the meat product to move forward to the cutting edge 126. As it moves forward, the meat product 120 passes under the lasers 84A, B and C which measures the height of the product across its width at 3 points. The lateral width measuring means 73 measures the width of the product. With that information, the computer 126 calculates the "face area" of the product immediately under the lasers and in line with the side sensor element 81. From this information, the computer calculates a "volume" that is representative of the target weight for the draft through using the density factor taken from the above table.

The machine 12 can be easily cleaned by tilting open the slicer housing 38 to provide full access to the slicing blade 98. Similarly, the safety panel 42 can be removed to provide full access to the gate 72, lateral width measuring means 74, and sensor element 81. Hold down roller 82 would also be given easy access for cleaning purposes. All of this can be accomplished without the use of any tools.

From the foregoing, it is seen that this invention will achieve at least all of its stated objectives.

I claim:

1. The method of slicing a plurality of drafts from an elongated slab of meat product, comprising, laying a slab of product to be sliced on a supporting surface located upstream from a slicing blade wherein said slab has forward and rearward ends, opposite sides, and upper and lower surfaces, weighing said slab and measuring the length thereof while said slab is on said supporting surface, comparing the weight and length of said slab with historical data of known historical slabs having similar weights, lengths and density factors, and selecting an operational density factor from said historical data based upon historical slabs having weights and lengths similar to that of said slab, selecting a predetermined draft weight, selecting a predetermined number of slices for each draft to be sliced, calculating the volume of a first draft of said slab having said predetermined draft weight, and slicing said first draft into said predetermined number of slices of equal thickness.

2. The method of claim 1 comprising the further step of selecting predetermined parameters for the thickness of each slice and slicing said first draft within said parameters.

3. The method of claim 1 wherein said slab is held against movement while its length and weight are being measured.

4. The method of claim 1 wherein the upper and lower ends of said slab are held against relative movement as said slab is moved towards said slicing blade to prevent reactive movement of said slab while it is being sliced.

5. The method of claim 4 wherein vertical pressure is exerted on said first draft as it is moved towards said slicing blade.

6. The method of claim 1 wherein said slab is grasped at its upper and lower ends by upper and lower transport elements, respectively, to move said slab towards said slicing blade, and equalizing the speed of travel of said transport elements to maintain said slab in a relatively flat and stable position as said plurality of drafts are being sliced.

7. The method of claim 1 wherein the volume of said first draft is determined in part by measuring its lateral width and by sensing the configuration of its upper surface to determine an average face area.

8. The method of claim 7 wherein the configuration of the upper surface of said slab and the drafts of said slab are sensed by a sensor means that is free from physical contact with said slab.

9. The method of claim 8 wherein said sensor means is a laser means.

10. The method of claim 1 wherein the steps therein are repeated for a plurality of drafts until the length of said slab is sliced, and wherein the thickness of the slices of each draft vary from draft to draft in direct relation to the variances in thickness of each draft.

11. The method of claim 10 wherein the thickness of each slice falls within predetermined thickness parameters selected prior to the commencement of slicing any of said slab.

12. The method of claim 1 wherein vertical pressure is exerted on each draft to be sliced as said slab moves toward said slicing blade.

13. The method of claim 1 wherein the thickness of each slice is determined by controlling the velocity of said slab towards said slicing blade.

14. The method of claim 13 wherein the thickness of the slices in said first draft with respect to slices in a subsequent draft to be sliced is varied by changing the velocity of said slab towards said slicing blade during the times when said first draft and said subsequent draft is being sliced.

15. The method of claim 1 wherein the actual density of said slab is calculated after it is sliced, and said actual density along with the actual weight and length of said slab is recorded and stored for subsequent use in conjunction with said historical data.

16. A machine for slicing an elongated slab of meat product into a plurality of drafts of substantial equal predetermined weights and the same predetermined number of slices with the slices in each draft having the same thickness, comprising, a frame having an inclined support surface with upper and lower ends, a slicing means on said frame adjacent the lower end of said support surfaces, first means on said frame for weighing an elongated slab on said support surface, second means on said frame for measuring the length thereof before said slab is sliced, whereupon the length and weight of said slab can be measured while said slab is on said supporting surface to permit comparison thereof with historical data of known historical slabs having similar weights, lengths and density factors.

17. The machine of claim 16 wherein means are provided on said frame for moving a slab of meat towards said slicing means on said support surface and to a length measuring position upstream from said slicing means; stop means on said frame for stopping said slab of meat at said length measuring position, and means on said frame for measuring the lateral width and upper surface of said slab of meat as it moves from said position towards said slicing means.

18. The machine of claim 17 wherein means are on said frame for measuring the lateral width and upper surface of said slab of meat as it moves from said length measuring position towards said slicing means; said computer means being operationally connected to said means for measuring the lateral width and upper surface of said slab of meat, means on said computer for receiving the weight of drafts of said meat slab to be sliced and the number of slices per draft, means on said computer to determine the volume and density of a first draft to be sliced using said identified density factor, speed control means in said computer means to move said slab of meat and said first draft towards said slicing means, said speed control means operationally connected to said computer so that said first draft will be advanced towards said slicing means at a constant speed that will create a first draft at said predetermined weight with said predetermined number of slices all of uniform thickness.

19. The machine of claim 17 wherein said means for measuring the upper surface of said slab is free from physical contact with said slab.

20. The machine of claim 19 wherein said means for measuring the upper surface of said slab is a laser means.

21. The machine of claim 17 wherein a gripper means on said frame moves said meat slab to said length measuring position, said gripper means having a plurality of gripper elements thereon, said gripper means and said gripper elements being operationally connected to a control means so that said gripper elements will physically grip an upper end of said slab when said slab is in said length measuring position.

22. The machine of claim 21 wherein second gripping elements are mounted on said frame downstream from said stop means to grip the lower end of said slab as it moves toward said slicing means.

23. The machine of claim 22 wherein said gripper means and said second gripping elements are interconnected to move both the upper and lower ends of said slab towards said slicing means at the same velocity, and to hold said slab in a stable and flat position on said support means as it moves toward said slicing means.

24. The machine of claim 23 wherein a holddown roller on said frame engages the upper surface of said meat slab downstream of said stop means.

25. The machine of claim 17 wherein said stop means is a pivotal gate.

26. The machine of claim 16 wherein a computer means are operatively connected to said first and second means, said computer means having a storage bank therein including known historical data on slabs of meat having known weights, lengths, and density factors, means on said computer means for comparing the weight and length of said slab to said historical data for comparison with historical slabs of similar weight and length to permit identification of the density factor of such historical slabs.

27. A machine for slicing an elongated slab of meat product into a plurality of drafts of substantial equal predetermined weights and the same predetermined number of slices with the slices in each draft having the same thickness, comprising, a frame having an inclined support surface with upper and lower ends, a slicing means on said frame adjacent the lower end of said support surfaces, first means on said frame for weighing an elongated slab on said support surface, second means on said frame for measuring the length thereof before said slab is sliced, a computer means operatively connected to said first and second means, said computer means having a storage bank therein including known historical data on slabs of meat having known weights, lengths, and density factors, means on said computer means for comparing the weight and length of said slab to said historical data for comparison with historical slabs of similar weight and length to permit identification of the density factor of such historical slabs.

28. The machine of claim 27 wherein means are on said frame for measuring the lateral width and upper surface of said slab of meat as it moves from a length measuring position upstream from said slicing means towards said slicing means; said computer means being operationally connected to said means for measuring the lateral width and upper surface of said slab of meat, means on said computer for receiving the weight of drafts of said meat slab to be sliced and the number of slices per draft, means on said computer to determine the volume and density of a first draft to be sliced using said identified density factor, speed control means in said computer means to move said slab of meat and said first draft towards said slicing means, said speed control means operationally connected to said computer so that said first draft will be advanced towards said slicing means at a constant speed that will create a first draft at said predetermined weight with said predetermined number of slices all of uniform thickness.

* * * * *